United States Patent
Mukai et al.

(10) Patent No.: US 7,751,681 B2
(45) Date of Patent: Jul. 6, 2010

(54) TIME-SERIES DATA RECORDING DEVICE AND TIME-SERIES DATA RECORDING METHOD

(75) Inventors: Toshirou Mukai, Chiba (JP); Keiko Watanuki, Ibaraki (JP)

(73) Assignee: Sharp Kabushiki Kaisha, Osaka (JP)

( * ) Notice: Subject to any disclaimer, the term of this patent is extended or adjusted under 35 U.S.C. 154(b) by 2210 days.

(21) Appl. No.: 10/364,346

(22) Filed: Feb. 12, 2003

(65) Prior Publication Data

US 2003/0152360 A1 Aug. 14, 2003

(30) Foreign Application Priority Data

Feb. 14, 2002 (JP) .............................. 2002-036344

(51) Int. Cl.
*H04N 5/91* (2006.01)
*H04N 7/00* (2006.01)
(52) U.S. Cl. .............................. 386/46; 386/83; 386/89; 386/123
(58) Field of Classification Search .................... 386/46, 386/83, 89, 123
See application file for complete search history.

(56) References Cited

U.S. PATENT DOCUMENTS

| | | | | |
|---|---|---|---|---|
| 6,323,908 B1 * | 11/2001 | Kida et al. | .................. | 348/460 |
| 6,643,453 B1 * | 11/2003 | Arai et al. | .................. | 386/109 |
| 6,678,462 B1 * | 1/2004 | Chihara | ........................ | 386/83 |
| 7,272,295 B1 * | 9/2007 | Christopher | .................. | 386/46 |
| 2002/0054068 A1 * | 5/2002 | Ellis et al. | .................... | 345/716 |
| 2004/0040035 A1 * | 2/2004 | Carlucci et al. | ............... | 725/32 |

FOREIGN PATENT DOCUMENTS

| | | | |
|---|---|---|---|
| JP | 02249161 A | * | 10/1990 |
| JP | 05047069 | * | 7/1991 |
| JP | 06111416 A | * | 4/1994 |
| JP | 6-58424 U | | 8/1994 |
| JP | 10-174039 A | | 6/1998 |
| JP | 10-285503 A | | 10/1998 |
| JP | 2854752 B2 | | 11/1998 |

* cited by examiner

*Primary Examiner*—Thai Tran
*Assistant Examiner*—Girumsew Wendmagegn
(74) *Attorney, Agent, or Firm*—Birch, Stewart, Kolasch & Birch LLP

(57) ABSTRACT

Time-series data are recorded retroactively from a time point precedent to a time point of definitively starting recording. Provided is a time-series data recording device for recording time-series data, which includes, a control unit having first characteristic detecting means for detecting a first characteristic to be a candidate for a record starting time point of the time-series data, a temporary storage unit for storing information concerning a first time point representing occurrence of the first characteristic, and second characteristic detecting means for detecting a second characteristic to determine record starting of the time-series data, a first recording unit for recording the time-series data after a second time point representing detection of the second characteristic, and a second recording unit for recording the time-series data between the first time point and the second time point.

13 Claims, 10 Drawing Sheets

TIME-SERIES DATA RECORDING DEVICE AND TIME-SERIES DATA RECORDING METHOD

BACKGROUND OF THE INVENTION

1. Field of the Invention

The present invention relates to a technology for deciding an output starting time point or a record starting time point of time-series data.

2. Related Art

The technology disclosed in Japanese Patent No. 2854752, for example, is known as a technology for outputting time-series data, which refer to data that vary with time. In this technology, a keyword existent in broadcast information is recognized, and recording is started on the basis thereof.

Moreover, Japanese Unexamined Patent Publication No. 10(1998)-174039 discloses a technology for a video recording device, in which existence of a registered keyword is confirmed upon starting timer-controlled video recording so as to detect an extension of a live telecast of a baseball game or the like that causes a delay of a starting time point of a subsequent program to shift a record starting time point of the subsequent program appropriately.

However, the technology disclosed in Japanese Patent 2854752 bears a problem that recording can be started only after recognition of the keyword and at a time point close to existence of the keyword.

Meanwhile, the video recording technology disclosed in Japanese Unexamined Patent Publication No. 10(1998)-174039 bears a problem that recording is not started until a keyword for indicating the program is recognized; therefore, a part (the beginning part) of the information a user actually wishes to obtain cannot be recorded.

SUMMARY OF THE INVENTION

It is an object of the present invention to provide a technology for deciding an output starting time point and a record starting time point of time-series data so as to effectuate entire recording of desired time-series data.

According to one aspect of the present invention, there is provided a time-series data recording device for recording time-series data, which includes: a control unit including first characteristic detecting means for detecting a first characteristic to be a candidate for a record starting time point of the time-series data, a temporary storage unit for storing information concerning a first time point representing occurrence of the first characteristic, and second characteristic detecting means for detecting a second characteristic to determine record starting of the time-series data; a first recording unit for recording the time-series data after a second time point representing detection of the second characteristic; and a second recording unit for recording the time-series data between the first time point and the second time point.

When the second characteristic is detected, the first time point is decided as an actual record starting time point and at least the time-series data from the second time point are recorded in the first recording unit. Using the above-described time-series data recording device, it is possible to record and reproduce the time-series data from the first time point, by use of the time-series data between the first time point and the second time point that are recorded in the second recording unit and by use of the time-series data recorded in the first recording unit from the second time point.

According to another aspect of the present invention, there is provided a time-series data recording device for recording received time-series data, which includes: a first recording unit and a second recording unit for recording time-series data; and a control unit including recording period setting means for effectuating a preset of a recording period of the time-series data into the first recording unit, first information detecting means for detecting first information concerning a change of the recording period included in the time-series data and preset in the recording period setting means, recording period changing means for changing setting of the recording period setting means based on the first information, and record starting means for allowing the second recording unit to start recording of the time-series data after detection of the first information.

When time information regarding the change of the recording period is included in the first information and if the change is aimed at a shorter period than the recording period preset in the recording period setting means, the recording period changing means can change the setting of the recording period setting means.

DESCRIPTION OF THE PREFERRED EMBODIMENTS

In this specification, time-series data refer to video image data, music data and the like, for example, in which information therein varies with time. Moreover, description will be made in this specification mainly regarding a time-series data recording device. However, it is to be noted that a device for reproducing and outputting time-series data after recording shall be also included in the scope of the present invention.

Before explaining an embodiment of the present invention, description will be made regarding consideration given by the inventor. The inventor of the present invention has given consideration concerning a technology for recognizing characteristic information regarding time-series data such as a keyword existent in television broadcast information, and for starting recording retroactively from a time point (a first time point) which is precedent to a time point (a second time point) of recognition of the keyword. The first time point for starting recording retroactively will be referred to as a starting time point candidate.

The time point to be the starting time point candidate may be the nearest time point to the keyword out of time points of scene changes on a television screen, for example. The starting time point candidate is continuously detected per given timing. Alternatively, it is also possible to narrow down the time point to be the starting time point candidate by use of a sub keyword group which belongs to the keyword.

When an appropriate keyword for determining an actual starting time point is detected afterwards, the relevant starting time point candidate is retroactively set as an actual data record starting time point. Since such an actual data record starting time point is located precedent to the time point of detecting the actual starting time point, a buffer memory for temporarily storing time-series data from the time point of the starting time point candidate is required in addition to a normal recording device. If the starting time point candidate is updated per given timing, it is possible to reduce a data capacity to be stored in the buffer memory.

Moreover, when timer-controlled video recording is set on a time-series data recording device, there may be the case where broadcast time is changed due to extension of a program precedent to a desired program for such timer-controlled video recording. In this case, some announcements to inform thereof should be made presumably. Therefore, it is satisfactory if setting time for the timer-controlled video recording is changed on the basis of such announcement information.

Meanwhile, it is possible to recognize the predetermined keyword by use of at least one piece of information out of voice information, caption text data, image data, and the like, which are included in the broadcast information and the like. When the keyword is recognized, firstly, the data stored in the buffer memory are outputted (reproduced). Thereafter, data recorded (image-recorded) in a normal storage unit are outputted (reproduced).

In other words, it is possible to record and reproduce (output) the data retroactively from the time point which is precedent to the time point of deciding such recording, based on the data stored in the buffer memory and the data stored in a general recording unit. In addition to a loudspeaker, a display screen and the like, destination of output may include a removable medium such as a magneto-optical disk, or a recording medium such as a hard disk or a video tape. Alternatively, the data may be outputted directly to a display unit.

Based on the foregoing consideration, description will be made regarding the time-series data recording technology according to embodiments of the present invention with reference to the accompanying drawings.

Firstly, description will be made regarding the time-series data recording technology according to a first embodiment of the present invention with reference to FIGS. 1 to 3.

The time-series data recording technology of this embodiment shows an example of performing recording retroactively from the past (from the time point before the time point of deciding the recording) without timer-controlled video recording.

In the time-series data recording technology of this embodiment, control is made upon decoding broadcast information so as to record a scene when a preset condition is satisfied. However, a period for verifying as to whether or not the given condition is satisfied generally requires time in a range from several frames to several seconds. For this reason, if recording is started after confirming satisfaction of the condition for starting recording, then the beginning part of the desired scene will not be recorded.

Description will be made regarding the time-series data recording technology of this embodiment with reference to FIG. 1.

Figure 1:
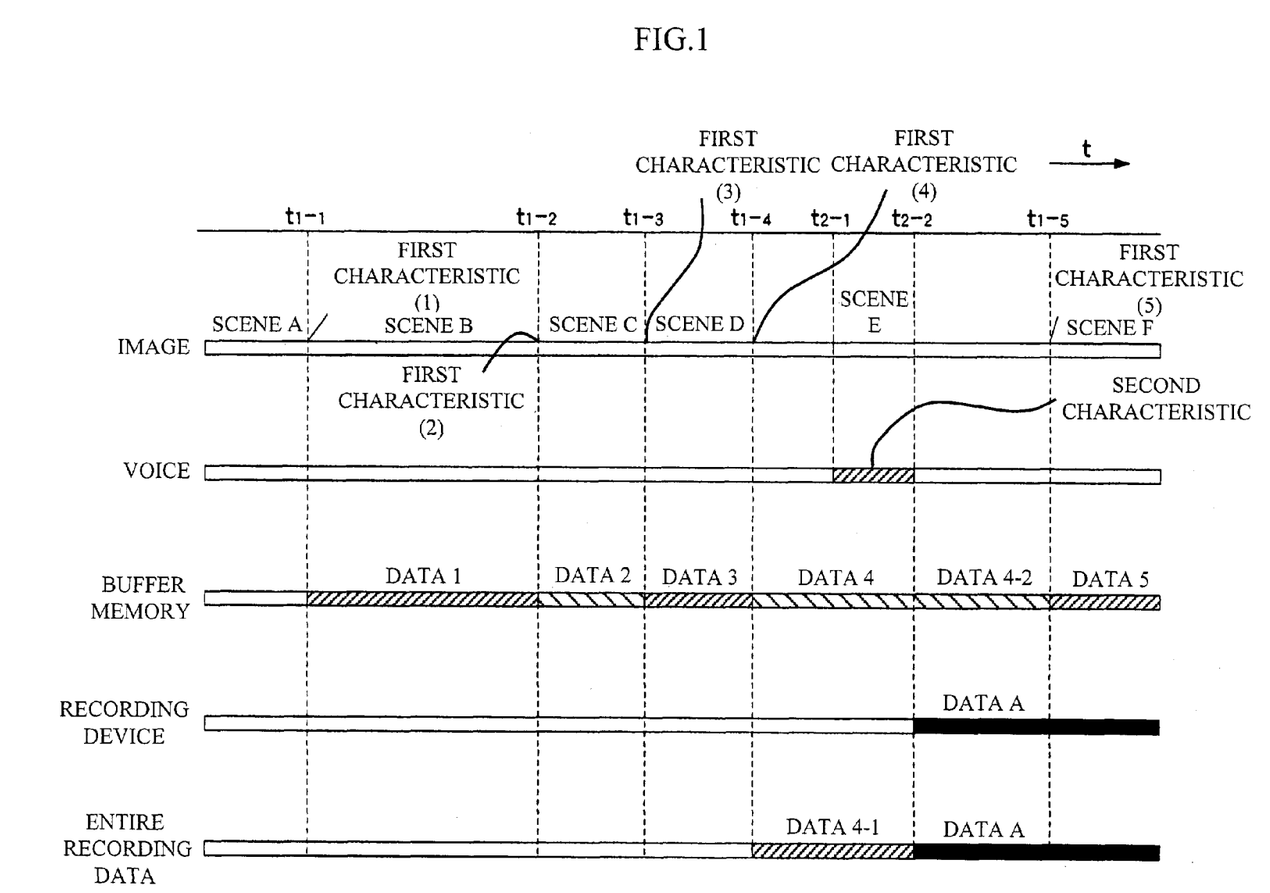
FIG. 1 is a timing chart for explaining a principle of operation of a time-series data recording device according to an embodiment of the present invention.

FIG. 1 is a view showing a time-series flow of data processing of image data and voice data. In addition, FIG. 1 also shows recording situations of time-series data concerning a buffer memory and a recording device, and a recording situation of combination of the both data.

As shown in FIG. 1, there are five scene changes (such as a scene change from a scene A to a scene B at time $t_{1-1}$) in a period from the time $t_{1-1}$ to time $t_{1-5}$. The time $t_{1-1}$ to the time $t_{1-5}$ are referred to a first characteristic (1) to a first characteristic (5), respectively, and each time point with a scene change is deemed as a record starting time point candidate. The record starting time point candidate moves from the time $t_{1-1}$ toward the time $t_{1-5}$ with passage of time.

At least time-series data between two adjacent scene changes are stored in the buffer memory, and the time-series data stored in the buffer memory are updated from data 1 to data 5 at each time of the scene change.

For example, an assumption is made herein that a second characteristic is detected at time $t_{2-1}$ located between the time $t_{1-4}$ and the time $t_{1-5}$. When this second characteristic is detected, the record starting is determined. In this event, the time point $t_{1-4}$ which is the immediately precedent record starting time point candidate is selected as an actual record starting time point. The time-series data in the period from the time $t_{1-4}$ to the time $t_{2-1}$ are stored in the buffer memory. Since recording is started by using the recording device from the time $t_{2-1}$, it is possible to record and reproduce the time-series data retroactively from the time precedent to the time $t_{2-1}$ of detection of the second characteristic, in combination with the time-series data which are stored in the buffer memory.

Timing concerning the time-series data recording will be described more concretely with reference to FIG. 2. Assumption will be made herein that keywords for the record starting are "Nagashima" and "home run", and that voice information on the air contains a phrase of "Nagashima hit a home run."

The image changes from a scene A to a scene B at time t1. The information "Nagashima hit a home run." is obtained as the voice information in a period between the time t1 and time t2. As described above, this information satisfies a condition for deterministically starting recording. Since the keywords and the voice information coincide with or are similar to each other, it is possible to decide the record starting at the time point of detection of the voice information. Accordingly, the data are recorded in the recording device at the time t2. However, the home run by Nagashima actually occurs before the time t2 when the record starting is decided. Accordingly, in order to record the scene (such as the scene B) entirely inclusive of at least a precedent part of the actual home run scene, the information from the time t1 should be stored in a buffer memory, for example.

Figure 3:
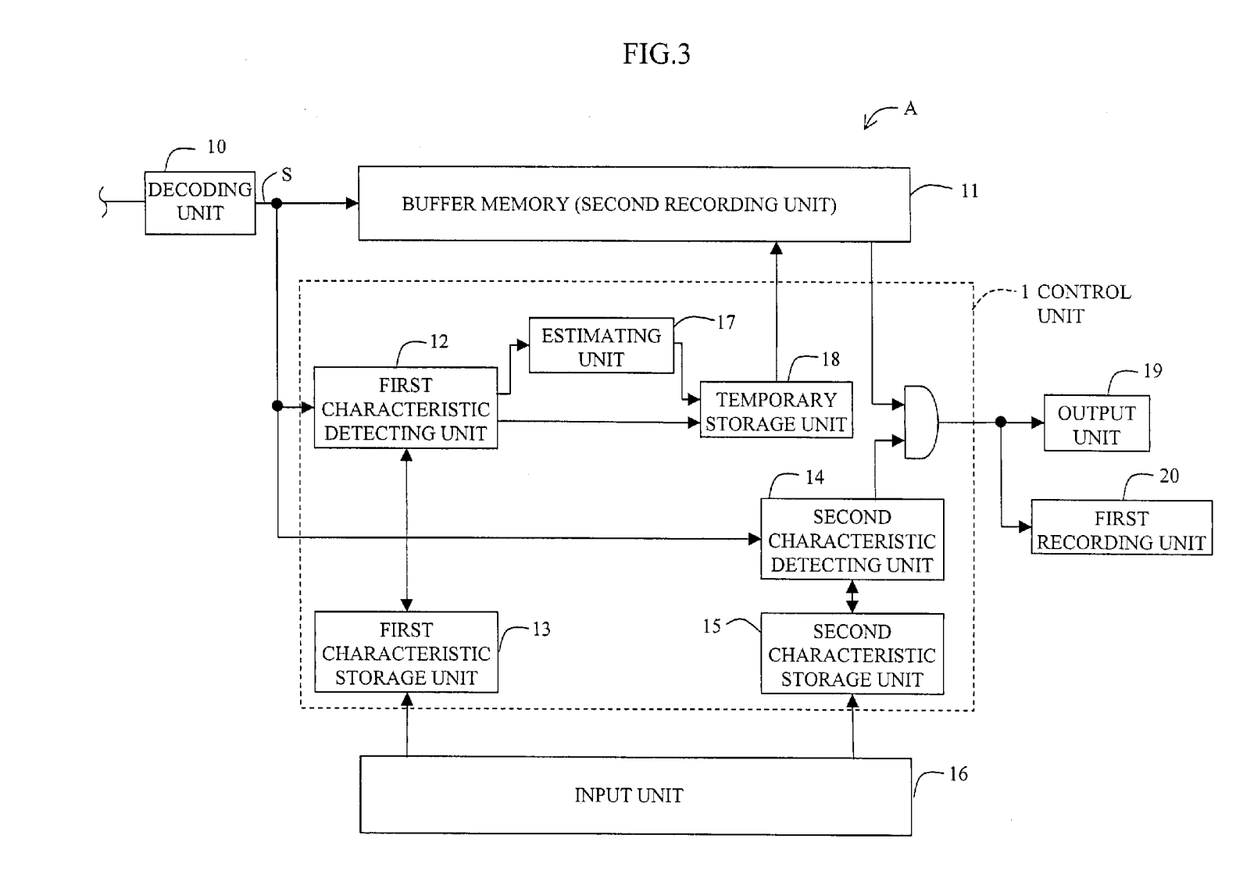
FIG. 3 is a functional block diagram showing a schematic configuration of a time-series data recording device according to the first embodiment of the present invention.

FIG. 3 is a functional block diagram showing a configuration of a time-series data recording device of this embodiment.

As shown in FIG. 3, a time-series data recording device A of this embodiment includes a control unit 1, decoding unit 10, a buffer memory (a second recording unit) 11, an input unit 16, an output unit 19, and a first recording unit 20. The control unit 1 includes a first characteristic detecting unit 12, a first characteristic storage unit 13, a second characteristic detecting unit 14, a second characteristic storage unit 15, a temporary storage unit 18, and a synchronizing circuit 21. Description regarding an estimating unit 17 will be made in a second embodiment.

A time-series signal (broadcast data) S is accumulated in the buffer memory 11 through the decoding unit 10, and is passed through the control unit 1 and outputted to at least any one of the output unit 19 and the recording unit 20.

Meanwhile, the time-series signal S is also inputted to the first characteristic detecting unit 12, and the first characteristic detecting unit 12 detects a characteristic which can be a candidate for a record starting time point out of a current frame. When the characteristic which can be the candidate for the record starting time point is detected, the detected time point is stored in the temporary storage unit 18. The contents of the characteristic for judging as to whether or not the characteristic can be the candidate for the record starting time point are inputted from the input unit 16, for example, and are stored in the first characteristic storage unit 13. In this event, the time point of occurrence of first information (a first time point) is also stored in the temporary storage unit 18 as the record starting time point candidate.

Moreover, the time-series signal S is also inputted to the second characteristic detecting unit 14, and the second characteristic detecting unit 14 detects a second characteristic such as a keyword. The contents of the second characteristic to be a judging material for determining the record starting time point are inputted from the input unit 16, for example, and are stored in the second characteristic storage unit 15.

When the second characteristic is detected and the actual record starting time point is decided out of the record starting time point candidates, the actual record starting time point is selected from the record starting time point candidates in the first information stored in the temporary storage unit 18. The first recording unit 20 starts recording of the time-series data from the time point of judgment. Meanwhile, the time-series data in the period between the first time point and a second time point are stored in the buffer memory 11.

Therefore, desired scenes can be entirely recorded and reproduced by use of the information stored in the buffer memory 11 and the information actually recorded in the recording unit 20.

A more detailed process flow will be described with reference to a flowchart of FIG. 4.

Figure 4:
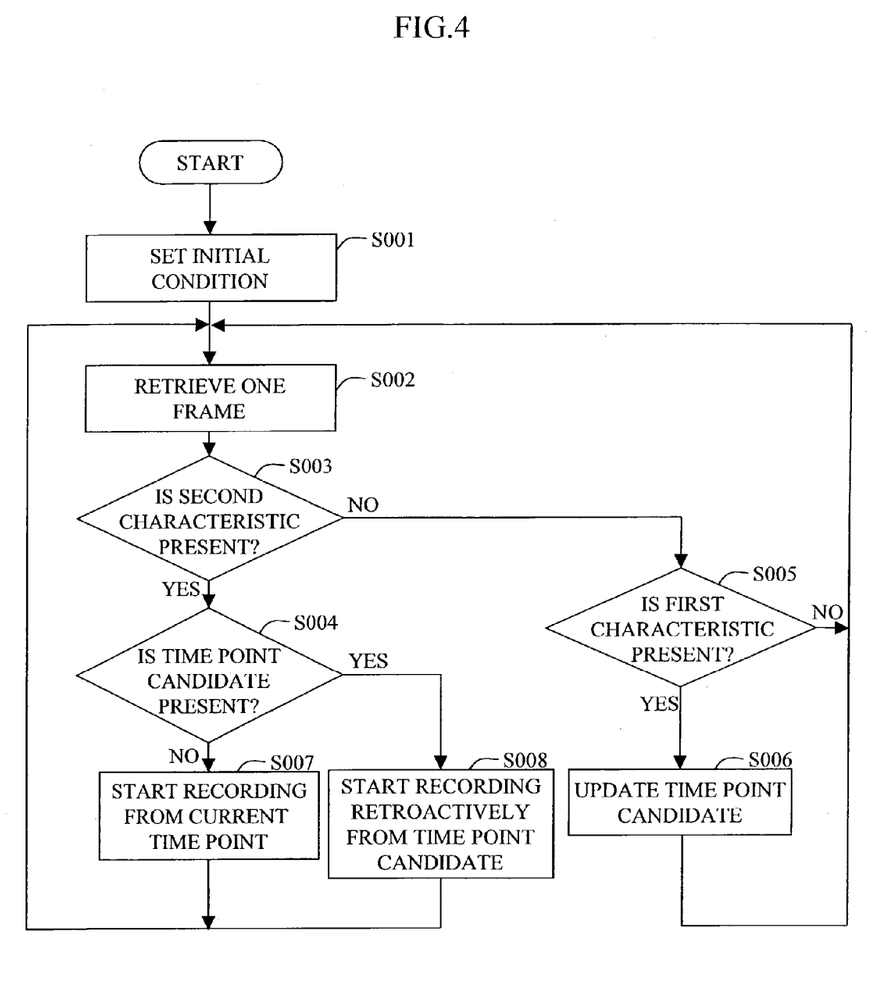
FIG. 4 is a flowchart showing a flow of the time-series data recording process according to the first embodiment of the present invention.

As shown in FIG. 4, an initial condition is set in Step S001. The initial condition includes, for example, a scene change to be the first characteristic, given timing, and the like. Next, in Step S002, the time-series data (the broadcast information) equivalent to just one frame are read out and stored in the buffer memory.

In Step S003, the second characteristic is detected for determining the record starting time point. When the second characteristic is detected, the process moves to Step S004. In Step S004, judgment is made as to whether or not the record starting time point candidate is stored in the temporary storage unit 18 (FIG. 3). If judgment is made that the record starting time point candidate is stored, then the process moves to Step S008 and recording by the first recording unit 20 (FIG. 3) is started. The information from an output candidate time point to the record starting time point can be read out of the buffer memory 11 through the circuit 21. The information from the output candidate time point to the record starting time point thus read out may be bonded to the front part of the data recorded in the first recording unit 20. If judgment is made that no record starting time point candidate exists, then the process moves to Step S007, and recording is started from the current time point.

If judgment is made that no second characteristic exists in Step S003, then the process moves to Step S005. In Step S005, existence of a new first characteristic is checked, in other words, checking is made as to whether or not the record starting time point candidate is updated. If the new first characteristic exists, then the process moves to Step S006. Here, the record starting time point candidate is updated and stored in the temporary storage unit 18, and then the process returns to Step S002. A time point of a scene change is selected as the record starting time point candidate. If the first characteristic does not exist, then the process returns to Step S002.

As described above, according to the data recording device of the first embodiment of the present invention, when the second characteristic for recording desired information is detected, it is possible to record the information concerning the second characteristic retroactively from the time point of detection of the first characteristic. Since detection of the desired information is performed based on the characteristic concerning the information, it is possible to improve accuracy of selection concerning the information to be recorded.

If the above-described technology is used, the actual record starting time point concerning the desired information is decided based on the record starting time point candidate, which is continuously updated, and on the first time point. Accordingly, it is possible to shorten the time period from the record starting time point candidate to the actual record starting time point, and to reduce a data capacity to be stored in the buffer memory. Therefore, it is possible to reduce a capacity of the buffer memory.

Note that the flowchart shown in FIG. 4 cannot express the case when detection of the record starting time point candidate and detection of an output decision time point are simultaneous. However, it is general to cause a delay between a time point when the output decision time point is detected and an actual output starting time point, and the delay is equivalent to a period from several frames to several tens of frames. Therefore, it is not necessary to suppose a case of updating a candidate for the output starting time point within the frame at which the output decision time point is detected.

Next, description will be made regarding a time-series data recording technology according to a second embodiment of the present invention with reference to FIGS. 5 and 6. The time-series data recording technology of this embodiment supposes timer-controlled video recording (the recording). For example, a case of performing timer-controlled video recording with a video recorder corresponds to this embodiment.

Figure 2:
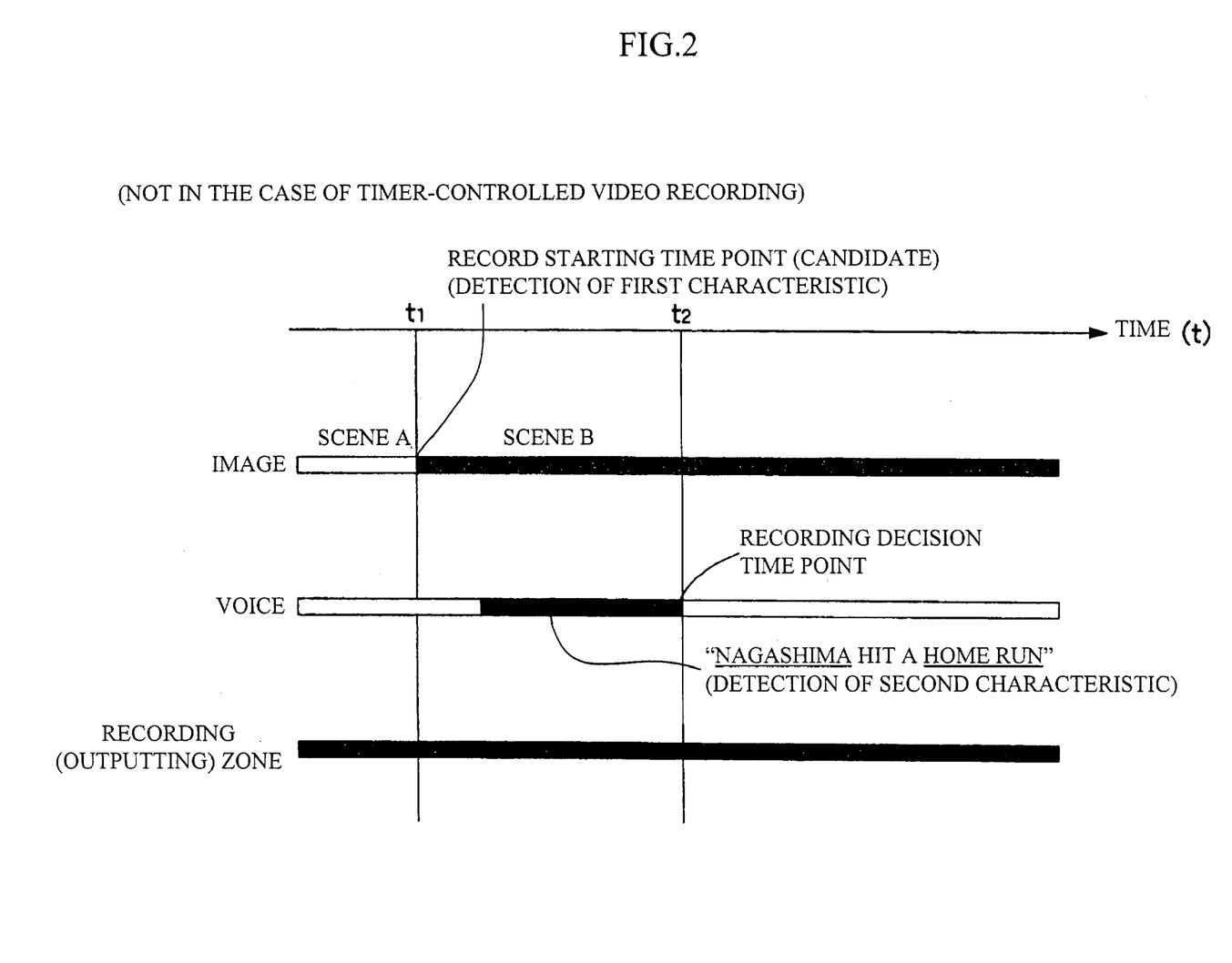
FIG. 2 is a timing chart showing a time-series data recording process according to a first embodiment of the present invention.
Figure 6:
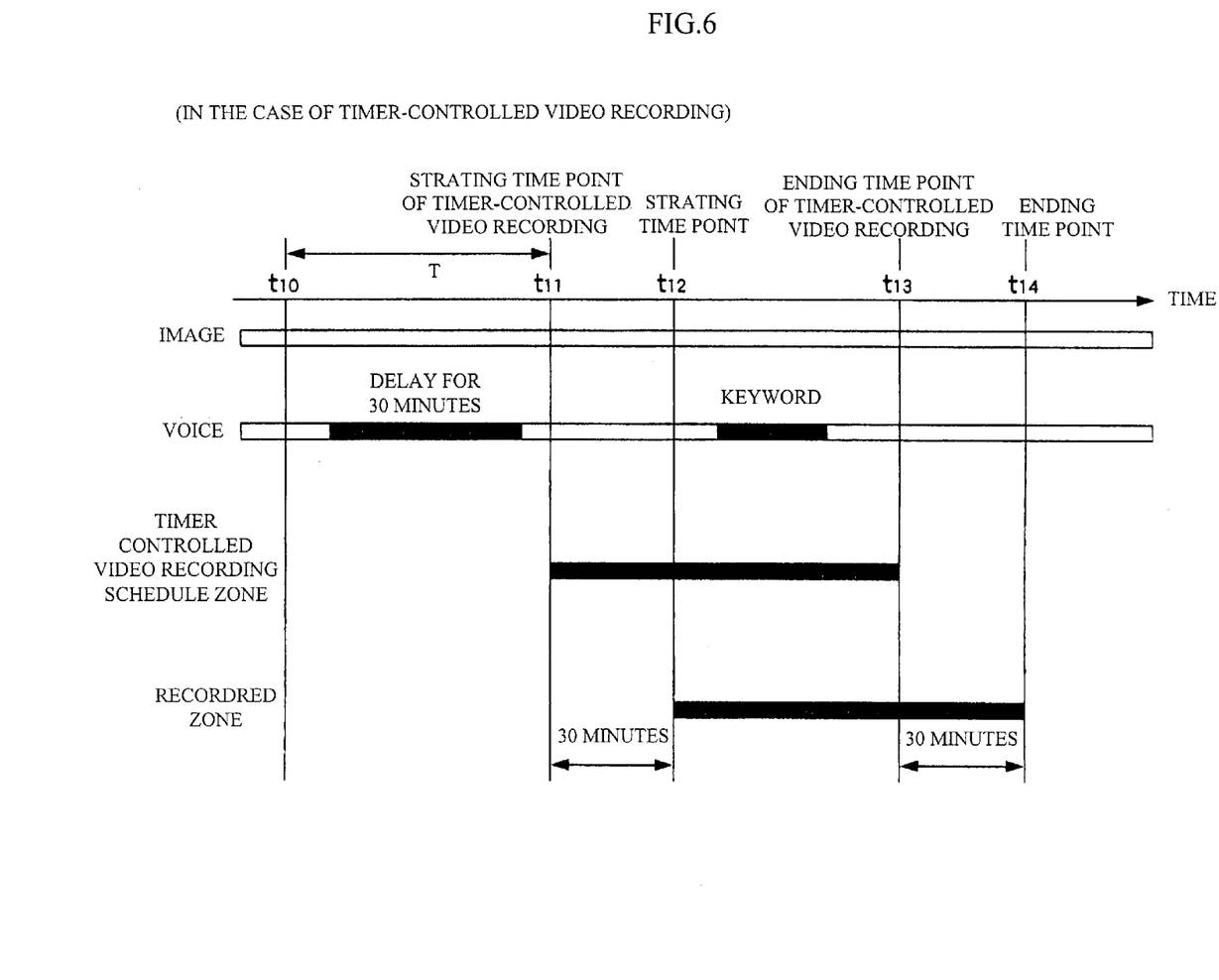
FIG. 6 is a timing chart showing the time-series data recording process according to the second embodiment of the present invention.

FIG. 6 is a timing chart corresponding to FIG. 2. Upon timer-controlled video recording, there may be a case when broadcast time is changed because of extension of a program precedent to a desired program for timer-controlled video recording or because of insertion of special newscast or the like. In such a case, time schedule set in the timer needs to be changed. When there is a schedule change of a program, such a change is generally informed by an announcement. Accordingly, such an announcement is recognized and a preset schedule for timer-controlled video recording is thereby changed (shifted). Incidentally, burden of a process for detecting an announcement is increased if detection of the announcement is performed continuously in a period after setting timer-controlled video recording until an actual starting time point of timer-controlled video recording. Accordingly, the detecting process should be performed from just a certain period precedent to the time point of starting the timer-controlled video recording, in other words, from a given time period T (a period relevant to a storage capacity of a buffer memory) precedent to the time point of starting the timer-controlled video recording. The time period T will be described later.

Here, description will be made regarding a change of starting time for video recording. A change of a record ending time point will be described later.

Description will be made regarding a flow of the time-series data recording technology of this embodiment with reference to FIGS. 5 and 6. Reference will be also made to FIG. 3 as appropriate.

As shown in FIG. 3, a time-series data recording device of the second embodiment of the present invention has a configuration of adding an estimating unit 17 to the time-series data recording device according to the first embodiment. In the time-series data recording technology of this embodiment, there may be also a case when an output starting time point candidate is later than the current time point.

Therefore, the first characteristic detecting unit 12 shown in FIG. 3 checks as to whether or not a characteristic for changing a record starting time point is included in time-series data. If such a characteristic is included therein, the estimating unit 17 estimates how long the time should be shifted. When necessary, the record starting time point candidate is updated based on the estimation of the estimating unit 17, and is stored in the temporary storage unit 18. All other configurations are identical to those in the first embodiment.

Figure 5:
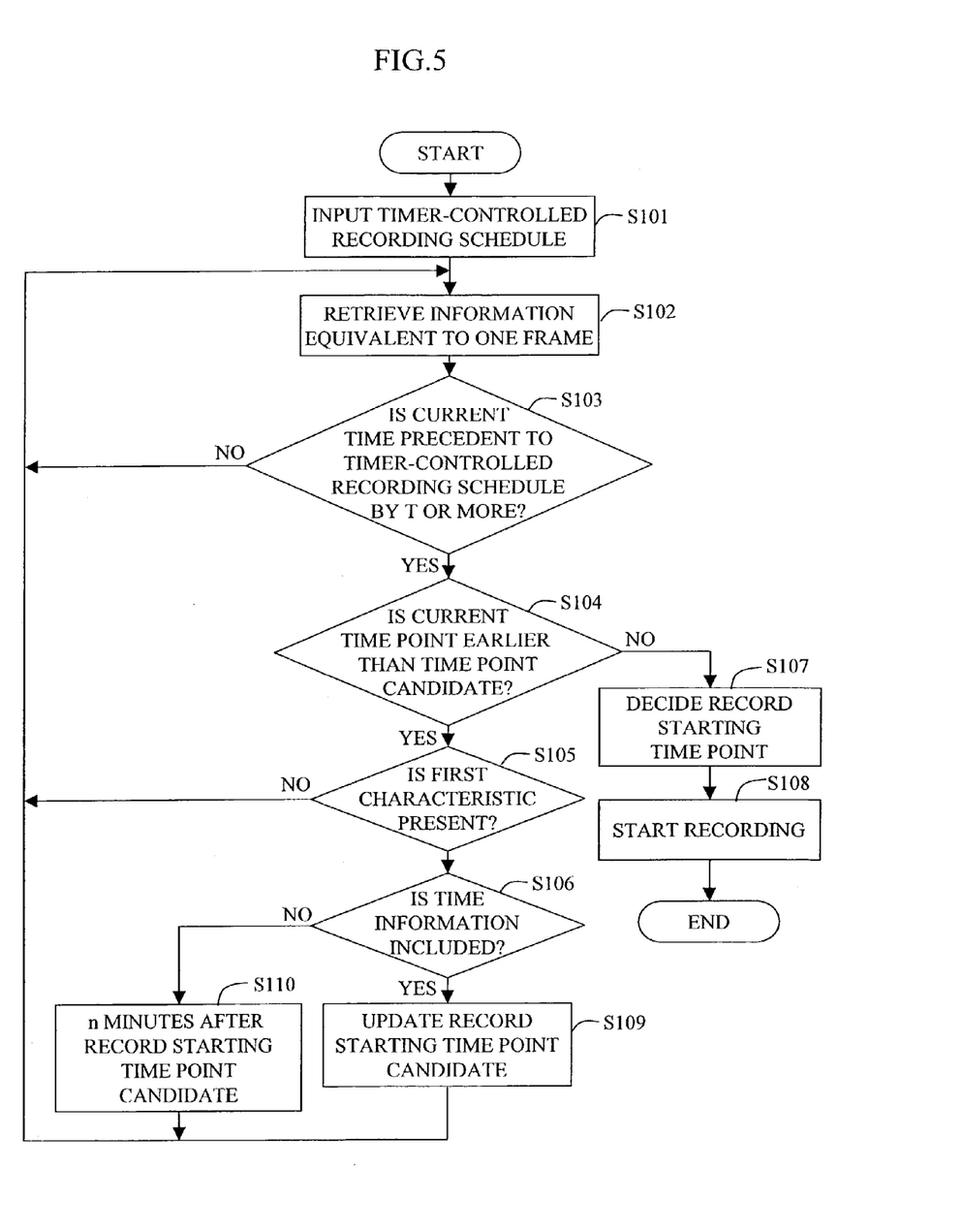
FIG. 5 is a flowchart showing a flow of a time-series data recording process according to a second embodiment of the present invention.

FIG. 5 is a flowchart corresponding to FIG. 4. In Step S101, information concerning timer-controlled video recording is inputted from the input unit. A timer-controlled video recording starting time point $t_{11}$ thus inputted constitutes an initial value for a video recording starting time point candidate. In Step S102, information equivalent to one frame is retrieved from the decoding unit 10 into the buffer memory 11 (FIG. 3). In Step S103, judgment is made as to whether or not a time period from the current time point to the timer-controlled video recording starting time point $t_{11}$ is shorter than the given time period T. If the time period from the current time point to the timer-controlled video recording starting time point $t_{11}$ is longer than the given time period T, then the process returns to Step S102. If the time period from the current time point to the timer-controlled video recording starting time point $t_{11}$ is shorter than the given time period T, then the process moves to Step S104.

In Step S104, judgment is made as to whether or not the current time point is earlier than the output starting time point candidate ($t_{11}$). If the current time point is earlier than the output starting time point candidate ($t_{11}$), then the process moves to Step S105. In other cases, the process moves to Step S107.

If the first characteristic is detected in Step S105, then the process moves to Step S106. The first characteristic includes an announcement such as "This program will be extended." or an announcement such as "Subsequent programs will be delayed for 30 minutes." If no first characteristic is detected, then the process returns to Step S102.

In Step S106, if time information such as "5 minutes" or "30 minutes" is included in the first characteristic detected in Step S105, then the record starting time point candidate is updated in accordance with the time information in Step S109, and then the process returns to Step S102. When no time information is included in the first characteristic, a new output starting time point candidate is updated with a value obtained by adding n minutes to the time for the record starting time point candidate in Step S110, and then the process returns to Step S102. The television broadcasting nowadays frequently adopts 5 minutes as the minimum unit for changing a program schedule. In such a case, the n minutes may be defined as 5 minutes.

If the process moves from Step S104 to Step S107, the current time point is decided as the record starting time point, whereby recording is immediately started in Step S108.

In addition, at least the information after the record starting time point candidate until now is stored in the buffer memory, and the information stored in the buffer memory is combined when the actual record starting time point is decided out of the record starting time point candidates. In this way, it is possible to record the information retroactively from the record starting time point. Therefore, it is possible to record the desired data without loss.

Next, description will be made regarding a time-series data recording technology according to a modified example of the second embodiment of the present invention with reference to FIGS. 3 and 7.

Figure 7:
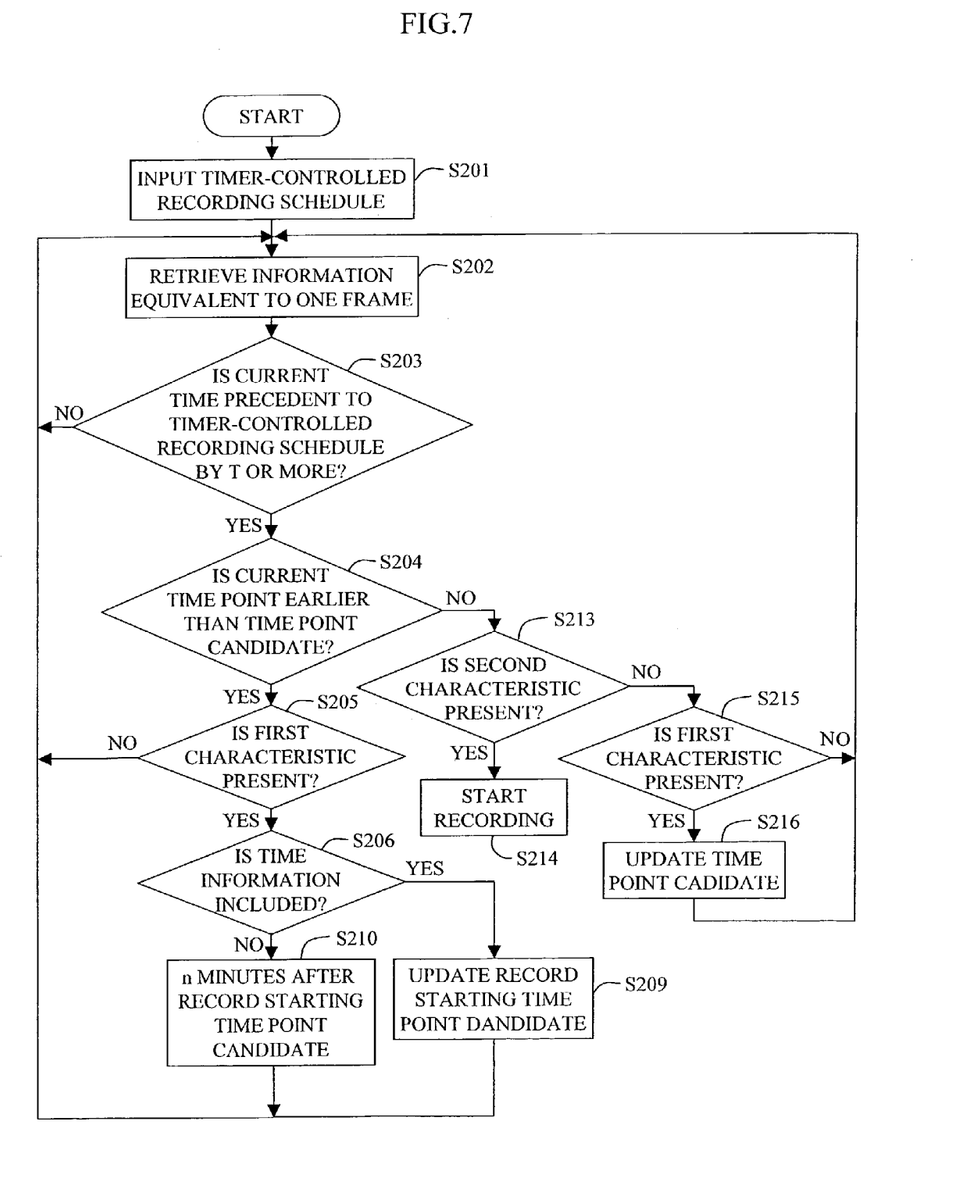
FIG. 7 is a flowchart showing a flow of a time-series data recording process according to a modified example of the second embodiment of the present invention.

A difference between a flowchart shown in FIG. 7 and the flowchart shown in FIG. 5 is the flow after Step S107 (after Step S203 in FIG. 7). That is, in the time-series data recording technology of this modified example, the record starting time point is determined after confirming as to whether or not the broadcast is actually started after the time for the record starting time point candidate, and then the actual recording is started.

If the current point is later than the record starting time point candidate in Step S204, then the process moves to Step S213. In Step S213, check is made as to whether or not the second characteristic for deciding the record starting time point candidate as the output starting time point is detected. If the second characteristic is detected, then the process moves to Step S214. Here, the record starting time point candidate is decided as the record starting time point, and the recording is started retroactively from the record starting time point. If no second characteristic is detected, then the process moves to Step S215.

In Step S215, the first characteristic for updating the record starting time point candidate is detected. When the first characteristic is detected, the process moves to Step S216 to update the record starting time point candidate and then returns to Step S202. If there is a scene change, for example, then the starting time point candidate is updated.

In the case of performing the timer-controlled video recording as described above, a schedule change is performed when information concerning a schedule change is detected before starting the timer-controlled video recording. Then, the video recording is performed after confirming as to whether or not the desired broadcast is actually started after starting the timer-controlled video recording. Therefore, it is possible to record the desired information reliably.

According to this modified example, detection of the past record starting time point candidate concerning the time-series data is performed as similar to the technology of the first embodiment, and furthermore, the estimating unit 17 estimates the record starting time point candidate by detecting the characteristic for changing the future record starting time point as similar to the technology of the second embodiment. In this way, it is possible to fine-adjust the record starting time point.

Figure 8:
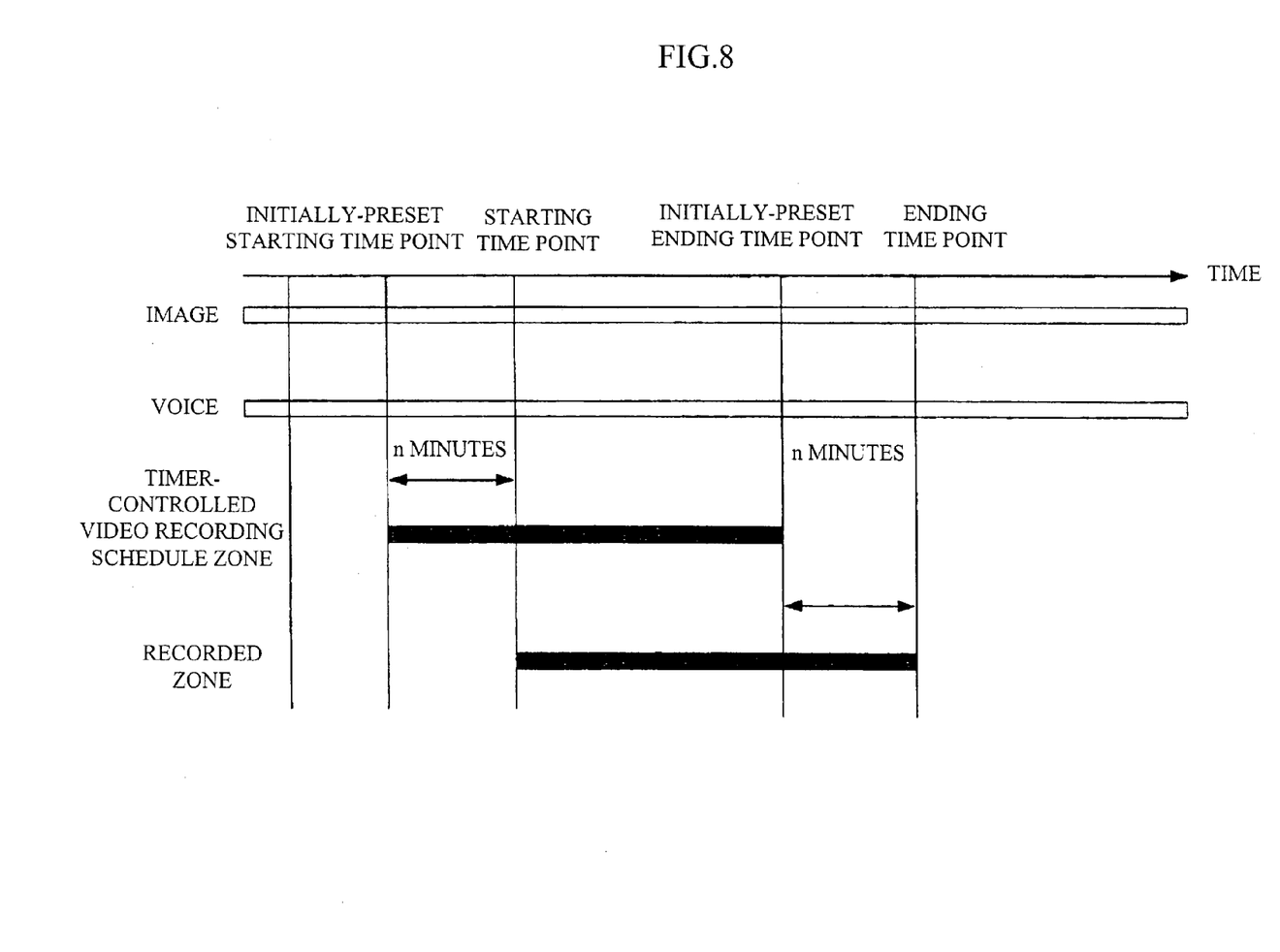
FIG. 8 is a view showing a first estimation technique concerning estimation of a record ending time point for terminating recording in a time-series data recording technology according to the second embodiment of the present invention.

Next, description will be made regarding estimation of the record ending time point for terminating the recording in the embodiment of the present invention with reference to FIGS. 8 to 10. FIG. 8 is a view showing a technique for easily estimating the record ending time point.

FIG. 8 shows a method applicable to the case of starting from record starting time point by delaying 30 (n) minutes behind the initially-scheduled starting time point. Here, in the method, the actual record ending time point is also delayed for 30 (n) minutes behind the initially-scheduled record ending time point similarly. In other words, FIG. 8 shows the method of changing the schedule for the record ending time point as equivalent to a change amount of the schedule for the record starting time point.

Figure 9:
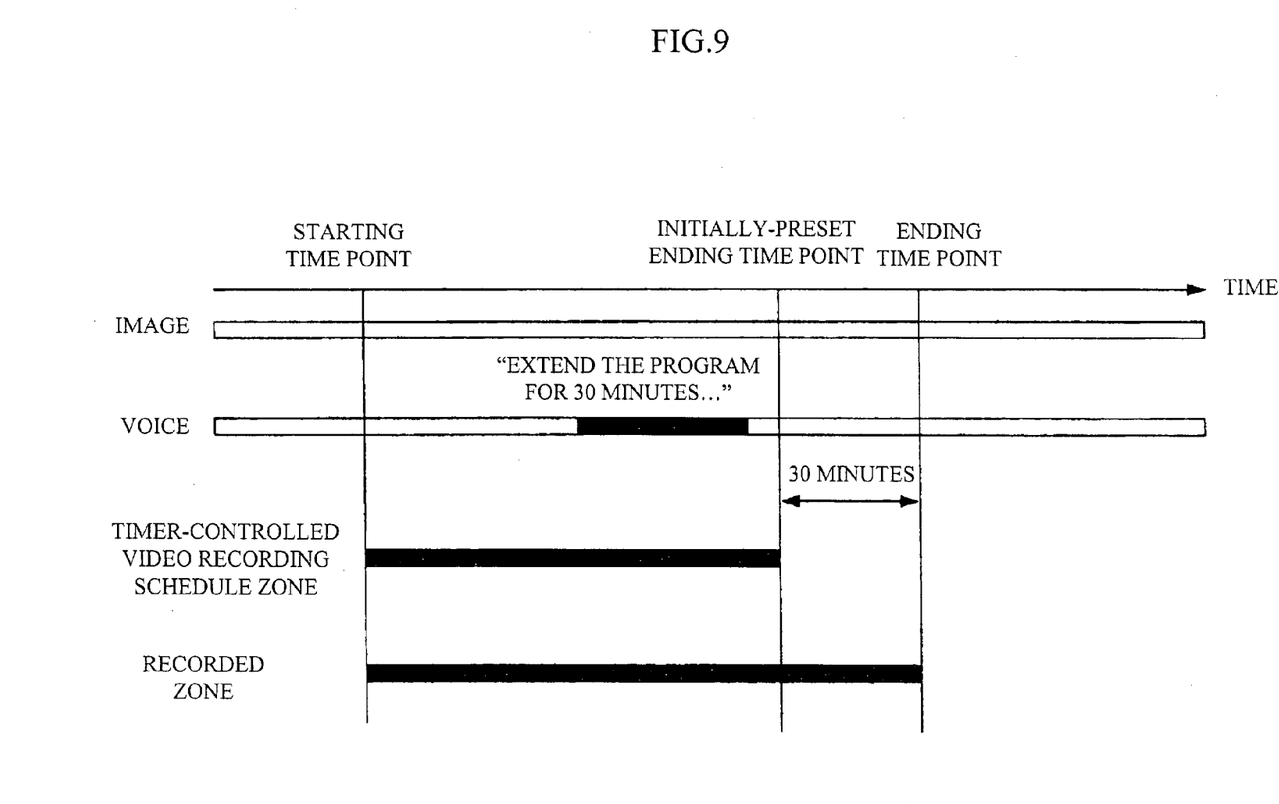
FIG. 9 is a view showing a second estimation technique concerning the estimation of the record ending time point for terminating recording in the time-series data recording technology according to the second embodiment of the present invention.

FIG. 9 is a view describing a case of extending the record ending time in the course of recording. FIG. 9 shows a method applicable to the case of timer-controlled video recording, in which the record ending time point is changed by use of information indicating extension of a precedent program after the initial schedule time. In other words, FIG. 9 shows the method of delaying the record ending time point for 30 minutes when there is an announcement concerning extension of the program for 30 minutes.

Figure 10:
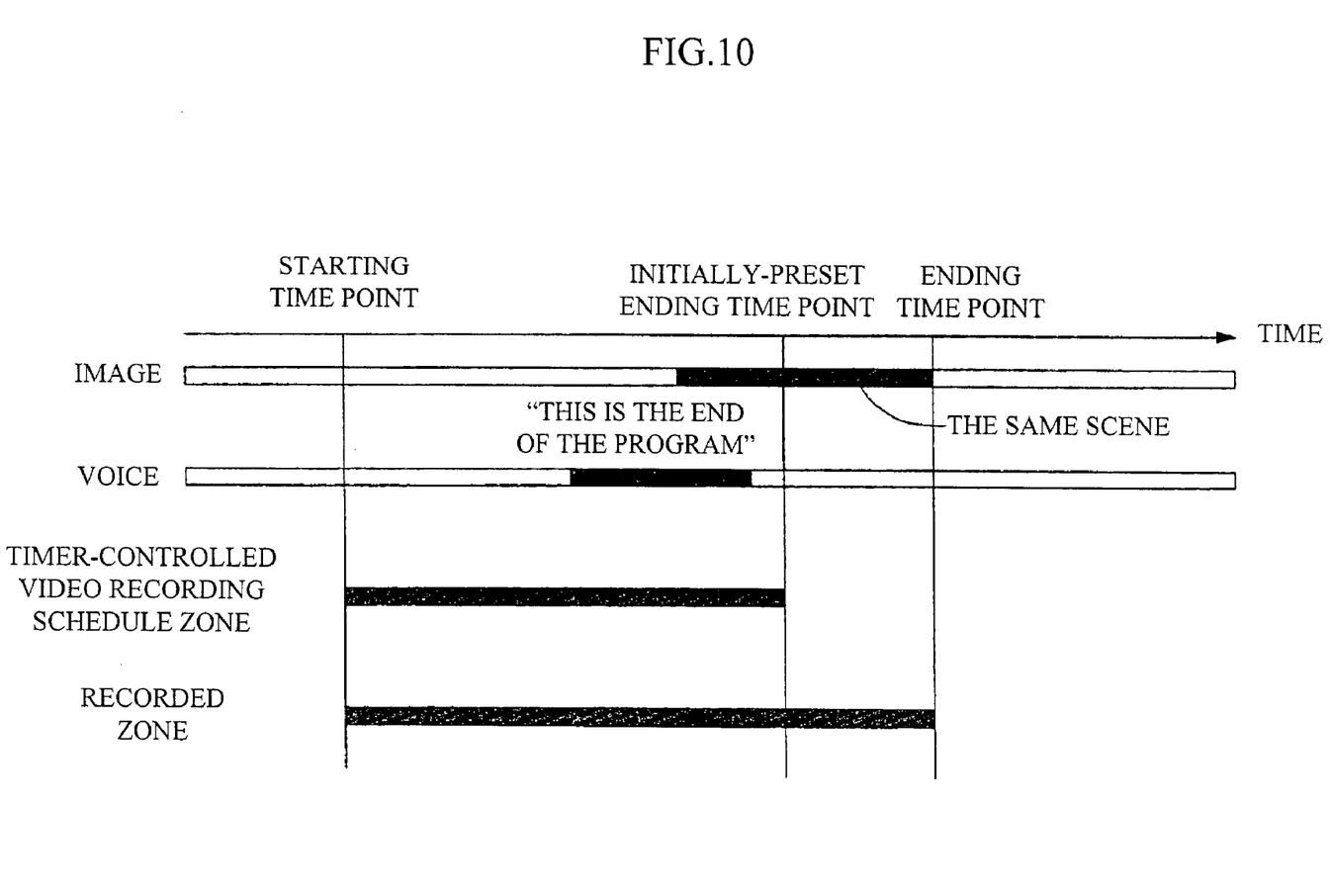
FIG. 10 is a view showing a third estimation technique concerning the estimation of the record ending time point for terminating recording in the time-series data recording technology according to the second embodiment of the present invention.

FIG. 10 shows a method in which a time point of a scene change at the nearest time point after confirmation of an end of a program is detected, for example, and the record ending time point is changed so as to continue recording until at least the above-described time point. For example, even if there is an announcement such as "This is the end of the program." before the initially-preset ending time point, the recording is continued until a scene change to another scene occurs. Note that the method such as the one in the second embodiment or in the modified example thereof may be used upon changing the ending time point as well.

Although description has been made regarding the recording processes of the embodiments of the present invention while using the television broadcast as an example, the present invention can also perform outputting processes of the television broadcast similarly. In addition, the present invention is not limited to the television broadcast only, but a similar process is also applicable to a case of streaming distribution of information by use of radio broadcast, the Internet, and the like. In this case, it is also possible to retrieve only desired information out of the distributed information.

Although the present invention has been described with some preferred embodiments, it is to be understood that the present invention is not limited to the embodiments expressly described herein. It is apparent for those skilled in the art that various modifications, improvements, and combinations will become possible from the teachings of this specification.

According to a time-series data recording technology of the present invention, it is possible to record time-series data retroactively from a time point precedent to a time point of definitively starting recording. Therefore, it is possible to record desired information without loss.

Moreover, if a record starting time point candidate is updated in line with time information in the case of performing timer-controlled video recording, then detection of a second characteristic should take place only in a given time period precedent to record starting. Therefore, a process for detecting the second characteristic is simplified as compared to the case of performing a detection process continuously.

What is claimed is:

1. A time-series data recording device for recording time-series data, comprising:
   a control unit including
   a first characteristic detecting unit detecting a first characteristic from said time-series data,
   a temporary storage unit storing and updating a first time point representing occurrence of the first characteristic when the first characteristic is detected by said first characteristic detecting unit;
   a second characteristic detecting unit detecting a second characteristic;
   a first recording unit automatically recording, upon detection of the second characteristic, the time-series data after a second time point representing detection of the second characteristic; and
   a second recording unit retroactively recording automatically, upon detection of the second characteristic, the time-series data between the first time point and the second time point,
   wherein said first characteristic is a candidate starting time point for starting recordation of time-series data, and
   wherein said second characteristic is an actual starting time point for starting recordation of time-series data.

2. The time-series date recording device according to claim 1, further comprising:
   a first storing unit for storing the candidate starting time point for the first characteristic, the first storing unit being linked with the first characteristic detecting unit; and
   a second storing unit for storing a candidate for the second characteristic, the second storing unit being linked with the second characteristic detecting unit.

3. The time-series data recording device according to claim 1, wherein the first characteristic detecting unit updates a time point of detection of a new characteristic as a new first time point and stores the new first time point in the temporary storage unit.

4. The time-series data recording device according to claim 2, wherein the first characteristic detecting unit updates a time point of detection of a new characteristic as a new first time point and stores the new first time point in the temporary storage unit.

5. The time-series data recording device according to claim 2, further comprising:
   an input unit for inputting any one of a content of the first characteristic and a content of the second characteristic to at least any one of the first storing unit and the second storing unit.

6. The time-series data recording device according to claim 3, further comprising:
   an input unit for inputting any one of a content of the first characteristic and a content of the second characteristic to at least any one of the first storing unit and the second storing unit.

7. The time-series data recording device according to claim 4, further comprising:
   an input unit for inputting any one of a content of the first characteristic and a content of the second characteristic to at least any one of the first storing unit and the second storing unit.

8. A time-series data recording method comprising:
   a step of receiving time-series data;
   a step of detecting a first characteristic from said received time-series data;

a step of storing and updating a first time point representing occurrence of the first characteristic when the first characteristic is detected;

a step of detecting occurrence of a second characteristic; and a first recording step of recording automatically, upon the detection of the second characteristic, the time-series data after the second time point, a second recording step of retroactively recording automatically, upon the detection of the second characteristic, the time-series data from the first time point to a second time point representing detection of occurrence of the second characteristic, wherein said first characteristic is a candidate starting time point for starting recordation of time-series data, and wherein said second characteristic is an actual starting time point for starting recordation of time-series data.

9. The time-series data recording method according to claim 8, further comprising:

a step of updating and storing a time point of detection of a new characteristic as a new first time point when the new characteristic is detected in the step of detecting the first characteristic.

10. A time-series data recording device for recording received time-series data, comprising:

first and second recording units for recording time-series data; and a control unit including recording period setting means for effectuating a preset of a recording period of the time-series data into the first recording unit, first information detecting means for detecting, from the time-series data, first information concerning a change of the recording period included in the time-series data and preset in the recording period setting means, recording period changing means for changing setting of the recording period setting means based on the first information, and record starting means for allowing the second recording unit to start recording of the time-series data after detection of the first information;

wherein the recording period changing means changes the setting of the recording period setting means as equivalent to a minimum time unit concerning a change of a program schedule when the first information detecting means detected the first information without inclusion of time information concerning the change of the recording period.

11. A time-series data recording device for recording received time-series data, comprising:

first and second recording units for recording time-series data; and a control unit including recording period setting means for effectuating a preset of a recording period of the time-series data into the first recording unit, first information detecting means for detecting, from the time-series data, first information concerning a change of the recording period included in the time-series data and preset in the recording period setting means, recording period changing means for changing setting of the recording period setting means based on the first information, and record starting means for allowing the second recording unit to start recording of the time-series data after detection of the first information, wherein the record starting means changes setting of the recording period setting means when a period between a time point of detection of the first information and a record starting time point set in the recording period setting means is shorter than a given time period; and the recording period changing means changes the setting of the recording period setting means as equivalent to a minimum time unit concerning a change of a program schedule when the first information detecting means detected the first information without inclusion of time information concerning the change of the recording period.

12. The time-series data recording device according to claim 10, further comprising:

second information detecting means for detecting second information to effectuate determination of the recording period of the time-series data, the second information which is linked with the first information.

13. The time-series date recording device according to claim 1, wherein the first characteristic detecting unit continuously detects the first characteristic from said time-series data, and the temporary storage unit stores and updates the first time point representing occurrence of the first characteristic each time the first characteristic is detected by said first characteristic detecting unit.

* * * * *